Patented Feb. 8, 1927.

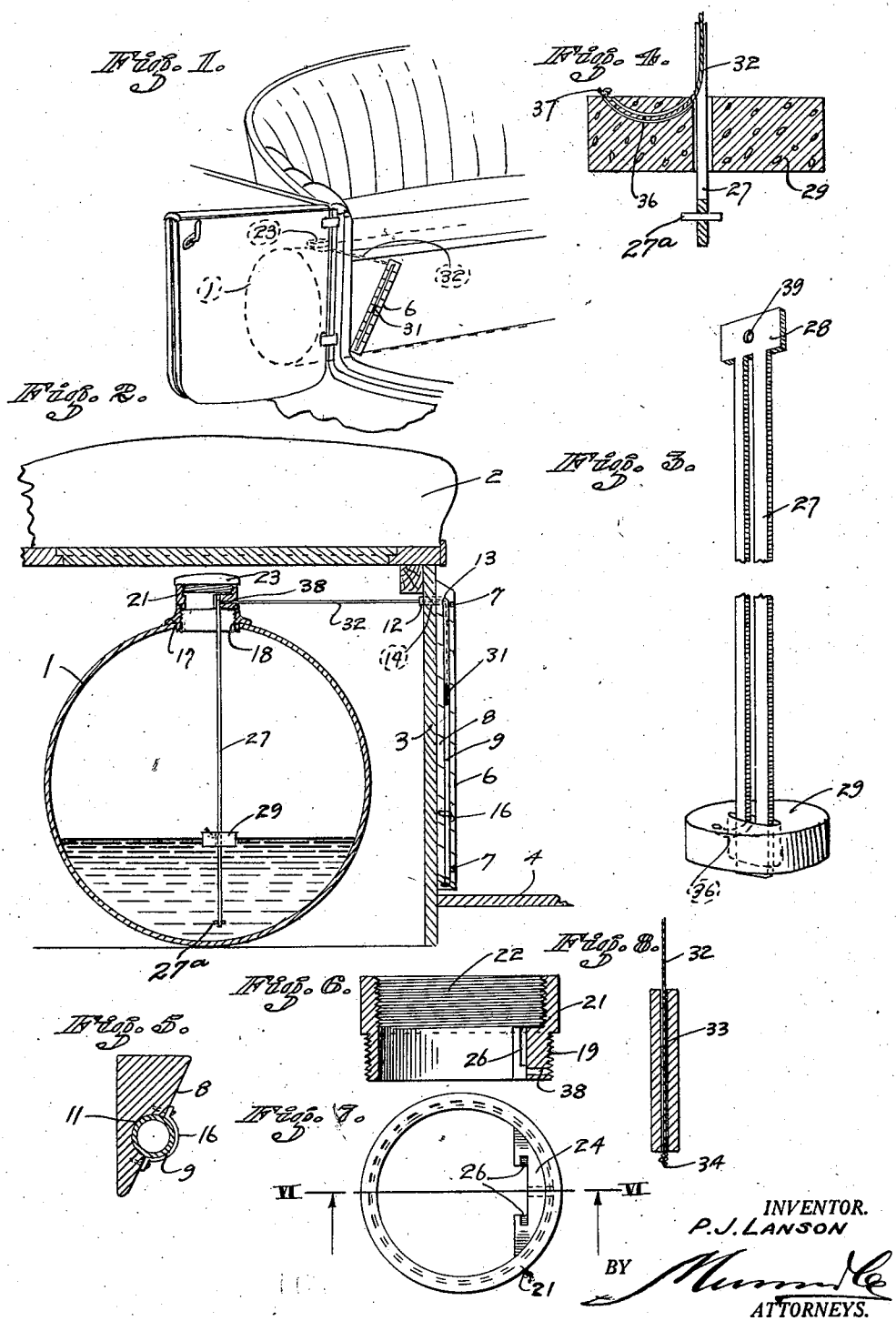

1,617,315

UNITED STATES PATENT OFFICE.

PAUL J. LANSON, OF SAN FRANCISCO, CALIFORNIA.

LIQUID-LEVEL GAUGE.

Application filed May 28, 1923. Serial No. 642,015.

The present invention relates to improvements in gauges or indicating devices and is particularly designed to be used for gauging the gasoline content of a motor vehicle tank. It is particularly designed to indicate to the driver of a motor vehicle at a glance how far his gasoline tank is filled. It is proposed to provide for this purpose a graduated scale preferably disposed on the wall supporting the front seat and to provide means for indicating thereon the amount of gasoline contained in the tank. It is further proposed to use a float within the tank and a flexible connection between the float and a weight passing over the graduated scale, the flexible connection being such as in no manner to interfere with the filling of the tank. Other objects and advantages of my device will appear as the specification proceeds.

The preferred form of my invention is illustrated in the accompanying drawings in which Figure 1 shows the general location of my device in the front portion of an automobile, Figure 2 a sectional view illustrating the general arrangement of my device, Figure 3 a perspective detail view of a float and a guide member for the same, Figure 4 a detail view illustrating the manner of fastening a cord to the float, Figure 5 a horizontal section through the scale, Figure 6 a vertical section through a sleeve associated with the neck of the tank taken along line VI—VI of Figure 7, Figure 7 a plan view of the same and Figure 8 a detail view illustrating the manner of fastening a weight to one end of the cord. While I have shown only the preferred form of my invention, it should be understood that various changes or modifications may be made within the scope of the claim hereto attached without departing from the spirit of the invention.

In Figures 1 and 2 is shown the general arrangement of a popular type of automobile with a gasoline tank (1) disposed under the front seat (2) and a front wall (3) supporting the front end of the seat. The general location of the floor is indicated at (4). A graduated scale (6) is secured to the front wall and since in the particular make of the automobile referred to the height of the tank slightly exceeds the height of the wall (3) the scale is preferably secured in a slanting position as shown in Figure 1. It may be held in place in any suitable manner as by means of screws passing through perforations (7) in the scale into the front wall. The scale is shown in cross-section in Figure 5 and is preferably made with a slanting face (8) which enables a driver entering the car to readily read the scale. A transparent tube (9) engages a recess (11) within the scale and is provided with a bent neck (12) extending through a perforation (13) within the scale and a perforation (14) in the wall (3). The tube may be held in place in any suitable manner as for instance by means of a latch (16).

The neck (17) of the tank (1) is threaded internally as shown at (18) and adapted to receive the external thread (19) of the sleeve (21) the upper part of which is threaded internally as shown at (22) to receive the cap (23). The lower portion of the sleeve which is not threaded interiorly is provided with a segment (24) forming a guideway (26) for the guide (27) shown in detail in Figure 3. The latter is provided with a crossplate (28) which holds the guide from falling through the guideway. A float (29) is adapted to ride on the guide and is prevented from falling therefrom by a stop 27ª secured to the bottom of the guide.

To provide an operative connection between the float and a weight (31) within the tube (9) I use a cord (32) one end of which is passed through an aperture (33) in the weight and turned into a knot as shown at (34) while the other end is secured to the float in the manner shown in Figure 4. It is passed through a curved passage (36) communicating at both ends with the upper face of the float and a knot (37) prevents the cord from slipping out. The cord passes from the weight within the tube through the neck of the same, through an aperture (38) in the sleeve (21) and an aperture (39) in the guide (27).

My device is preferably attached in the following manner: The scale (6) is secured to the front of the wall (3) in the slanting position shown in Figure 1 with the neck of the tube extending through the wall in the manner shown in Figure 2. The cord (32) is preferably passed through the tube before the same is fastened and secured to the weight in the manner shown in Figure 8. The free end of the cord is then passed through the aperture (38) in the sleeve (21) and through the aperture (39) in the guide (27) which latter thereupon is dropped through the guideway (26) with the float in position. The tank may then be filled with gasoline so that the float rises to the top. The end of the cord is then guided through the passage (36) in the float and the whole device adjusted by allowing the weight (31) to drop to its lowermost position, indicating a full tank, whereupon the end of the cord is tied into a knot as shown at (37) in Figure 4 which completes the operation. As the gasoline is being used up the float is lowered and the weight raised correspondingly.

I claim:

In a device of the character described, a tank having a neck in the top thereof, a sleeve secured to the neck, a cap detachably secured to the upper end of the sleeve, said sleeve being provided interiorly with a transverse web, said web being provided with a guideway, and an elongated float guide extending into the tank and slidably disposed in the guideway of the web, said float guide having a head thereon adapted for engagement with the web for supporting the guide, said sleeve having a radial perforation therein allowing a cord to be guided therethrough for connection with a float.

PAUL J. LANSON.